US012105504B2

(12) United States Patent
Kotcher

(10) Patent No.: US 12,105,504 B2
(45) Date of Patent: Oct. 1, 2024

(54) RUN-TO-RUN CONTROL AT A MANUFACTURING SYSTEM USING MACHINE LEARNING

(71) Applicant: APPLIED MATERIALS, INC., Santa Clara, CA (US)

(72) Inventor: Pratik Champalal Kotcher, Chantilly, VA (US)

(73) Assignee: Applied Materials, Inc., Santa Clara, CA (US)

( * ) Notice: Subject to any disclaimer, the term of this patent is extended or adjusted under 35 U.S.C. 154(b) by 337 days.

(21) Appl. No.: 17/730,861

(22) Filed: Apr. 27, 2022

(65) Prior Publication Data

US 2023/0350394 A1    Nov. 2, 2023

(51) Int. Cl.
G05B 19/418    (2006.01)
G06F 18/2135    (2023.01)

(52) U.S. Cl.
CPC ............... *G05B 19/41865* (2013.01); *G05B 19/4183* (2013.01); *G05B 19/41835* (2013.01); *G06F 18/2135* (2023.01); *G05B 2219/45031* (2013.01)

(58) Field of Classification Search
None
See application file for complete search history.

(56) References Cited

U.S. PATENT DOCUMENTS

| | | | |
|---|---|---|---|
| 8,396,582 B2 | 3/2013 | Kaushal et al. | |
| 9,972,478 B2 | 5/2018 | Guha et al. | |
| 10,430,719 B2 | 10/2019 | David | |
| 10,734,293 B2 | 8/2020 | David | |
| 2021/0116896 A1 | 4/2021 | Arabshahi et al. | |
| 2022/0066411 A1* | 3/2022 | Ummethala | ......... G05B 19/401 |

FOREIGN PATENT DOCUMENTS

| | | |
|---|---|---|
| CN | 114270484 A | 4/2022 |
| WO | 2019-182913 A1 | 9/2019 |
| WO | 2021001109 A1 | 1/2021 |
| WO | 2021-104718 | 6/2021 |
| WO | 2021121906 A1 | 6/2021 |

OTHER PUBLICATIONS

International Search Report and Written Opinion for the International Application No. PCT/US2023/020074, mailed on Aug. 16, 2023, 10 pages.

* cited by examiner

*Primary Examiner* — Ryan A Jarrett
(74) *Attorney, Agent, or Firm* — LOWENSTEIN SANDLER LLP

(57) ABSTRACT

First data associated with a first process performed for a first layer of a substrate is identified. The first layer is to be further processed according to a second process. The first data is provided as input to a machine learning model that is trained to predict metrology measurement values for layers of substrates at the manufacturing system. An amount of drift of a first set of metrology measurement values for the first layer following completion of the first process and/or the second process from target values is determined. Modifications to a recipe for the second process is determined in view of the determined amount of drift and second data associated with a second substrate layer that was previously processed at the manufacturing system. The second process is updated based on the determined one or more modifications.

20 Claims, 6 Drawing Sheets

300

```
Identify first data associated with a first process performed for a first layer of a substrate at a
manufacturing system 310
                                        │
                                        ▼
Provide the first data as input to a machine learning model 312
                                        │
                                        ▼
Determine an amount of drift of a first set of metrology measurement values for the first layer
of the substrate following a completion of at least one of the first process or the second
process from a target set of metrology measurement values based on one or more outputs of
the machine learning model 314
                                        │
                                        ▼
Determine one or more modifications to a process recipe for the second process and second
data associated with a second layer of the substrate 316
                                        │
                                        ▼
Update the process recipe for the second process based on the determined one or more
modifications 318
```

FIG. 3

RUN-TO-RUN CONTROL AT A MANUFACTURING SYSTEM USING MACHINE LEARNING

TECHNICAL FIELD

Embodiments of the present disclosure relate, in general, to manufacturing systems and more particularly to run-to-run control at a manufacturing system using machine learning.

BACKGROUND

As the size of electronic devices continue to shrink, substrate processing complexity has continued to increase. Some techniques for manufacturing substrates can involve multiple different processes, with some advanced techniques (e.g., plasma etching) involving twenty or even more different processes. A multitude of process control variables of a substrate process can impact characteristics of a respective substrate after the substrate process is completed. Run-to-run (R2R) process control refers to a technique of modifying a process recipe between runs in order to minimize drift, shift, and/or variability of substrates. Process control systems can modify a process recipe by modifying or tuning settings associated with one or more process control variables associated with the process recipe (e.g., to optimize the process, to cause characteristics of the respective substrate to correspond to target characteristics, etc.). It can be difficult for a process control system to determine which process control variable settings to modify and/or how much to modify process control variable settings in order to optimize a respective process and/or cause substrate characteristics to correspond to target characteristics.

SUMMARY

Some of the embodiments described cover a method for run-to-run (R2R) control at a manufacturing system using machine learning. The method includes identifying first data associated with a first process performed for a first layer of a substrate at a manufacturing system. The first layer of the substrate is to be further processed according to a second process at the manufacturing system. The method further includes providing the first data as input to a machine learning model. The machine learning model is trained to predict metrology measurement values for one or more layers of substrates processed at the manufacturing system and a drift of the predicted metrology measurement values from target metrology measurement values. The method further includes determining, based on one or more outputs of the machine learning model, an amount of drift of a first set of metrology measurement values for the first layer of the substrate following a completion of at least one of the first process or the second process from a target set of metrology measurement values. The method further includes determining one or more modifications to a process recipe for the second process in view of the determined amount of drift and second data associated with a second layer of the substrate. The second layer of the substrate was previously processed at the manufacturing system according to a third process. The method further includes updating the process recipe for the second process based on the determined one or more modifications.

In some embodiments, a system includes a memory and a processing device coupled to the memory. The processing device is to identify first data associated with a first process performed for a first layer of a substrate at a manufacturing system. The first layer of the substrate is to be further processed according to a second process at the manufacturing system. The processing device is further to provide the first data as input to a machine learning model. The machine learning model is trained to predict metrology measurement values for one or more layers of substrates processed at the manufacturing system and a drift of the predicted metrology measurement values from target metrology measurement values. The processing device is further to determine, based on one or more outputs of the machine learning model, an amount of drift of a first set of metrology measurement values for the first layer of the substrate following a completion of at least one of the first process or the second process from a target set of metrology measurement values. The processing device is further to determine one or more modifications to a process recipe for the second process in view of the determined amount of drift and second data associated with a second layer of the substrate. The second layer of the substrate was previously processed at the manufacturing system according to a third process. The processing device is further to update the process recipe for the second process based on the determined one or more modifications.

In some embodiments, a non-transitory computer readable storage medium includes instructions that, when executed by a processing device, cause the processing device to identify first data associated with a first process performed for a first layer of a substrate at a manufacturing system. The first layer of the substrate is to be further processed according to a second process at the manufacturing system. The processing device is further to provide the first data as input to a machine learning model. The machine learning model is trained to predict metrology measurement values for one or more layers of substrates processed at the manufacturing system and a drift of the predicted metrology measurement values from target metrology measurement values. The processing device is further to determine, based on one or more outputs of the machine learning model, an amount of drift of a first set of metrology measurement values for the first layer of the substrate following a completion of at least one of the first process or the second process from a target set of metrology measurement values. The processing device is further to determine one or more modifications to a process recipe for the second process in view of the determined amount of drift and second data associated with a second layer of the substrate. The second layer of the substrate was previously processed at the manufacturing system according to a third process. The processing device is further to update the process recipe for the second process based on the determined one or more modifications.

BRIEF DESCRIPTION OF THE DRAWING

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 3 is a flow chart of a method for R2R control at a manufacturing system using machine learning, according to aspects of the present disclosure.

DETAILED DESCRIPTION OF EMBODIMENTS

Figure 1:
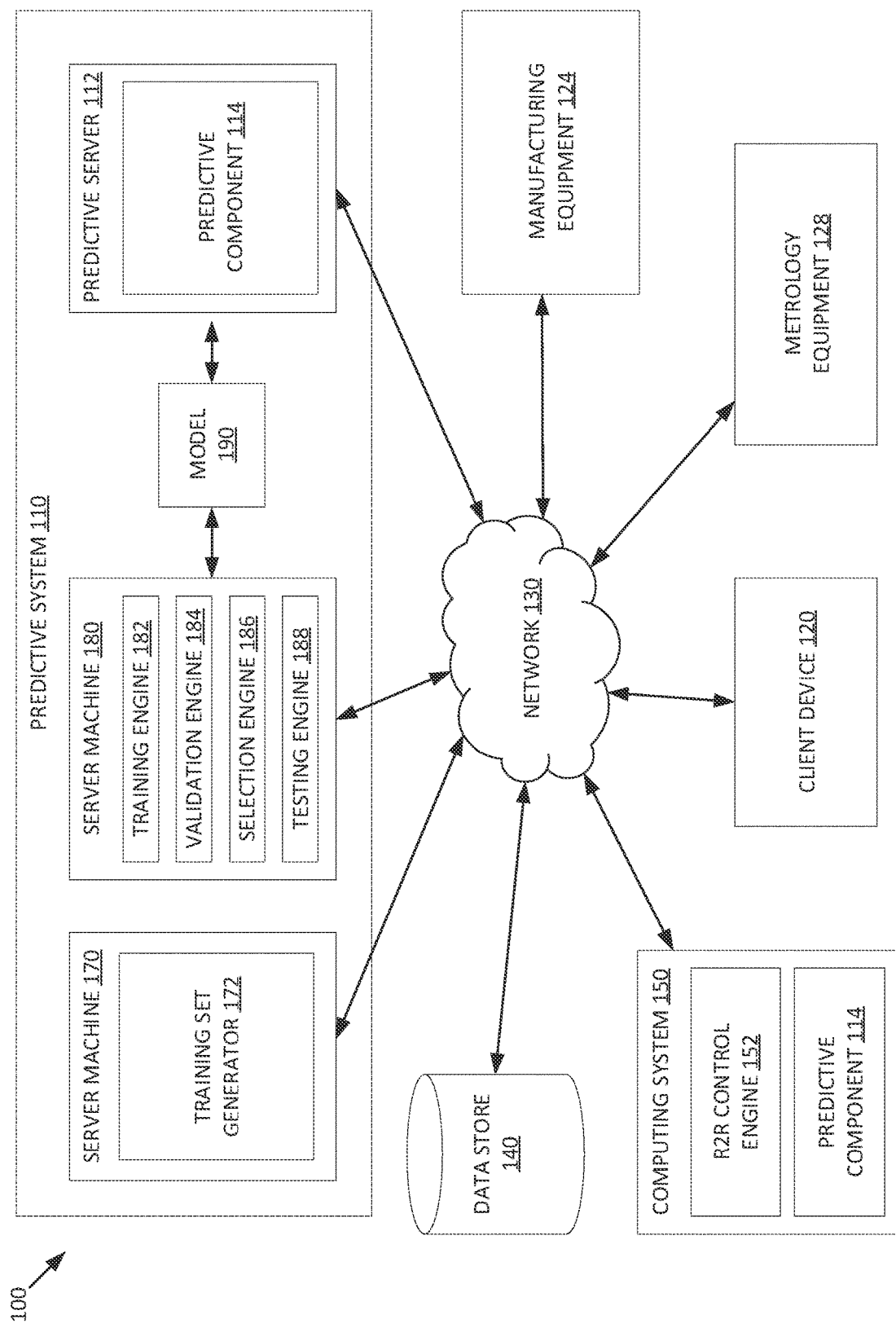
FIG. 1 depicts an illustrative system architecture, according to aspects of the present disclosure.

Implementations described herein provide systems and methods for run-to-run (R2R) control at a manufacturing system using machine learning. In some instances, a substrate can be subject to a significant number of processes before the substrate can be included in a final product. For example, lithography techniques involve depositing multiple layers of materials onto a surface of a substrate and forming highly complex patterns using the deposited layers (e.g., by etching away portions of one or more of the deposited layers). The substrate can be subject to multiple substrate process (e.g., processes to deposit each respective layer onto the substrate, processes to etch away portions of one or more layers from the substrate surface, etc.) before the complex patterns are formed on the substrate and the substrate can be included in a final product. As the size of electronic devices continue to shrink, the complexity of the patterns formed on substrates increases, which increases the overall substrate processing complexity. For instance, for some integrated circuits, a substrate can undergo a lithographic cycle (e.g., one or more deposition processes preceding and/or followed by one or more etching processes, etc.) as many as 50 times or more before a target pattern is formed on the surface of the substrate.

Manufacturing systems can include process control subsystems (also referred to as process control systems or simply process controllers herein), which are configured to tune and/or modify settings for processes performed for a substrate (or a lot or batch of substrates) in order to optimize a respective process and/or cause characteristics of the substrate (or lot of substrates) to correspond to target characteristics. Run-to-run (R2R) process control refers to a technique of tuning or modifying settings of a process recipe for a substrate process to minimize drift, shift, and/or variability of substrates. In some instances, characteristics of a substrate after completion of an initial substrate process can impact characteristics of the substrate after completion of a subsequent substrate process. For example, multiple deposition processes can be performed to deposit layers of materials on a surface of a substrate (e.g., in accordance with a lithography cycle described above). The characteristics of an initial layer deposited on the surface of the substrate can impact characteristics of subsequent layers deposited on the initial layer. In addition, before one or more subsequent layers are deposited on an initial layer, one or more processes can be performed to the initial layer to prepare for the subsequent layer process. For example, a chemical mechanical polishing process can be performed for an initial layer to prepare the initial layer for deposition of the subsequent layer. Such processes are referred to as upstream processes herein.

As indicated above, process control sub-systems can tune and/or modify settings for substrate processes. As each process performed for a substrate can impact characteristics of the substrate, it can be difficult for a process control sub-system to identify which settings should be tuned or modified and/or how much each setting should be tuned or modified. In some systems, metrology data can be collected for a substrate after completion of a process and the process control sub-systems can determine which settings to modify and/or how to tune or modify the settings for subsequent processes performed for the substrate based on the collected metrology data. However, collecting metrology data for each substrate, or even a portion of substrates in a lot, can take a significant amount of time, which can reduce an overall throughput and increase an overall latency of the manufacturing system. In addition, conventional process control sub-systems do not consider how characteristics of a substrate are impacted by upstream processes performed for the substrate to prepare the substrate for a subsequent substrate process (e.g., a subsequent deposition process, a subsequent etching process, etc.). Conventional process control systems do not detect variations and/or defects of substrate characteristics caused by an upstream process until after the substrate process is performed and metrology data is collected for the substrate. Accordingly, conventional process control systems do not tune or modify settings for the substrate process in order to counteract the variation and/or defect of the substrate characteristics caused by the upstream process before the substrate process is initiated and the variations or defects can be present on the substrate after the substrate process is completed. Such systems can perform additional processing operations to correct such variations or defects, in some instances. In other instances, such variations or defects cannot be corrected, and the substrate is therefore unusable. Correcting variations or defects by additional processing operations and/or removing unusable substrates from the manufacturing system can reduce an overall throughput and efficiency and increase an overall latency of the manufacturing system.

Aspects of the present disclosure address deficiencies of the conventional technology by providing systems and methods for run-to-run (R2R) control at a manufacturing system using machine learning. In some embodiments, a substrate (or a lot or batch of substrates) can undergo multiple substrate processes at a manufacturing system (e.g., in accordance with lithography techniques). Each process can correspond to a respective layer of the substrate, in some embodiments. For purposes of explanation and illustration only, a substrate process that is to be performed for a layer of a substrate (e.g., to deposit one or more layers, to etch away portions of one or more layers, etc.) is referred to herein as a current layer process. Such layer is referred to herein as a current layer. A substrate process that was previously performed for a layer of the substrate (e.g., prior to performance of the current layer process) is referred to herein as a prior layer process. Such layer is referred to as a prior layer or an initial layer herein. A process performed to prepare a substrate for a current layer process is referred to herein as an upstream process. Examples of upstream processes can include a polishing process (e.g., a chemical mechanical polishing process, etc.), a roughening process, an etching process, a deposition process, and so forth, in some embodiments.

A process control system can use machine learning techniques to determine one or more modifications to a current layer process to be performed for a substrate, in some embodiments. For example, following a completion of an upstream process (e.g., and before initiation of a current layer process), the process control system can identify data associated with the upstream process. The upstream process data can include, in some embodiments, data associated with one or more operations and/or settings associated with a process recipe for the upstream process, data collected by one or more sensors of the manufacturing system before, during, or after performance of the upstream process, and so forth. The process control system can provide the upstream process data as input to a machine learning model that is trained to predict metrology measurement values for one or more layers of substrates processed according to an upstream process and an amount of drift of the predicted metrology measurement values from target metrology measurement values for the substrate following the upstream process. In some embodiments, the machine learning model can be, or can otherwise correspond to, a variational recurrent auto-encoder model. Responsive to providing the upstream process data as input to the machine learning model, the process control system can obtain one or more outputs of the machine learning model and can determine an amount of drift of metrology measurement values of the substrate from the target metrology measurement values based on the obtained output(s). The determined amount of drift can correspond, in some embodiments, to a first correction factor that is to be applied by the process control system to tune or modify the settings associated with the process recipe for the current layer process.

In some embodiments, metrology data can be collected (e.g., using metrology equipment) following a performance of a prior layer process for the substrate. The process control system can determine an amount of drift of the collected metrology data from target metrology measurement values for the substrate following the prior layer process by comparing the collected metrology data to the target metrology measurement values. The determined amount of drift can correspond, in some embodiments, to a second correction factor that is to be applied by the process control system to tune or modify the settings associated with the process recipe for the current layer process. In additional or alternative embodiments, additional metrology data can be collected (e.g., using the metrology equipment) following a performance of the process recipe for the current layer process for other substrates at the manufacturing system. The process control system can determine the amount of drift of the additional metrology data from target metrology measurement values for the substrates following the current layer process, as described above. The determined amount of drift can correspond to a third correction factor to be applied by the process control system to tune or modify the settings associated with the process recipe for the current layer process, as described above.

The process control system can determine one or more modifications to a process recipe for the current layer process in view of the first correction factor, the second correction factor, and/or the third correction factor, in some embodiments and can apply the one or more modifications to the process recipe. After the substrate is processed according to the current layer process recipe, the process control system can identify metrology data collected for the substrate and can use the identified metrology data to further tune or modify settings associated with the current layer process recipe for future substrates processed at the manufacturing system. Further details regarding determining the one or more modifications to the current layer process recipe and performing the current layer process are provided herein.

Embodiments of the present disclosure provide techniques to optimize a substrate process and/or control characteristics of a substrate following a substrate process using machine learning. Embodiments of the present disclosure utilize machine learning techniques to determine an amount of drift of metrology measurement values from target metrology measurement values following an upstream process without removing the substrate from the manufacturing system to obtain such measurement values. Accordingly, an overall throughput of the manufacturing system is increased and an overall latency of the manufacturing system is decreased. Further, embodiments of the present disclosure enable a process control system to consider variation of a substrate caused by an upstream process in determining whether and/or how much to tune or modify settings for a current layer process. Accordingly, variations and/or defects of substrate characteristics can be detected and corrected earlier and after a fewer number of substrate processes, which further increases an overall throughput and efficiency of the manufacturing system and further decreases an overall latency of the manufacturing system.

FIG. 1 depicts an illustrative system architecture 100, according to aspects of the present disclosure. In some embodiments, system architecture 100 may be included as part of a manufacturing system for processing substrates. System architecture 100 may include one or more client devices 120, manufacturing equipment 124, metrology equipment 128, a predictive server 112 (e.g., to generate predictive data, to provide model adaptation, to use a knowledge base, etc.), computing system 150, and a data store 140. The predictive server 112 can be part of a predictive system 110. The predictive system 110 can further include server machines 170 and 180. The manufacturing equipment 124 can include sensors configured to capture data for a substrate being processed at the manufacturing system. In some embodiments, the manufacturing equipment 124 and sensors can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system). It should be noted that although metrology equipment 128 and manufacturing equipment 124 are depicted in FIG. 1 as separate components, metrology equipment 128 can be included as part of manufacturing equipment 124. For example, manufacturing equipment 124 can include a process tool. One or more components of metrology equipment 128 can be integrated within one or more components or stations of the process tool. For example, one or more components of metrology equipment 128 can be integrated within a factory interface, a load lock, a transfer chamber, a process chamber, and/or one or more additional stations of a process tool of manufacturing equipment 124.

Manufacturing equipment 124 produces products following a recipe and/or performing runs over a period of time. Manufacturing equipment 124 can include one or more sensors configured to generate data for a substrate during a substrate process (referred to as sensor data). Sensor data may include a value of one or more of temperature (e.g., heater temperature), spacing (SP), pressure, high frequency radio frequency (HFRF), voltage of electrostatic chuck (ESC), electrical current, flow, power, voltage, etc. Sensor data may be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

Metrology equipment 128 provides metrology data associated with substrates (e.g., wafers, etc.) processed by manufacturing equipment 124. The metrology data can include a value of one or more of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. In some embodiments, metrology equipment 128 can collect metrology data for each substrate processed at manufacturing equipment 124. In other or similar embodiments, metrology equipment 128 can collect metrology data for a portion of substrates processed at manufacturing equipment 124. For example, a lot of substrates can be processed at manufacturing equipment 124. Metrology equipment 128 can collect metrology data for a portion of the substrates in the lot (e.g., 15% of substrates in the lot, 20% of substrates in the lot, etc.). In some embodiments, systems of system architecture 100 (e.g., computing system 150, predictive system 110) can associate the metrology data collected for the portion of the substrates in the lot as representative of metrology data for each substrate in the lot.

The client device 120 includes a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, metrology data may be received from the client device 120. In some embodiments, client device 120 displays a graphical user interface (GUI), where the GUI enables the user to provide, as input, metrology measurement values for substrates processed at the manufacturing system. In other or similar embodiments, client device 120 can display another GUI that enables user to provide, as input, an indication of a type of substrate to be processed at the manufacturing system, a type of process to be performed for the substrate, and/or a type of equipment at the manufacturing system.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). In some embodiments, data store 140 can store data associated with a process performed, or to be performed, for one or more substrates at manufacturing equipment 124 (referred to as process data herein). Process data can include an indication of a process recipe associated with the process and/or settings for one or more operations of a process recipe. A process recipe refers to a set or series of operations and/or instructions associated with a process performed at manufacturing equipment 124. For example, a deposition process recipe can include a set or series of operations and/or instructions associated with performing a deposition process for a substrate at a process chamber of manufacturing equipment 124. In some embodiments, the process recipe can include a set of operations and/or instructions associated with transporting a substrate into and/or out of a particular station of manufacturing equipment 124. For example, the deposition process recipe can also include a set and/or series of operations associated with transporting the substrate into the process chamber (e.g., from the transfer chamber via a transfer chamber robot, etc.) before the deposition process is initiated and/or out of the process chamber (e.g., into the transfer chamber via the transfer chamber robot, etc.) following completion of the deposition process. In some embodiments, process data can refer to historical process data (e.g., process data associated with a prior process performed using manufacturing equipment 124) and/or current process data (e.g., process data associated with a current process performed, or to be performed, using manufacturing equipment 124).

In additional or alternative embodiments, data store 140 can store data collected for a substrate by sensors at or coupled to manufacturing equipment 124 before, during, and/or after performance of a substrate process (referred to as sensor data herein). For example, a process chamber can include one or more sensors (e.g., temperature sensors, spectral sensors, etc.) that are configured to collect data for a substrate and/or an environment within the process chamber before, during, or after a substrate process. A computing system associated with system architecture 100 (e.g., predictive system 110, computing system 150, a system controller for manufacturing equipment 124, etc.) can receive the sensor data collected before, during or after the substrate process and can store the sensor data at data store 140. In some embodiments, sensor data can refer to historical sensor data (e.g., sensor data collected for a prior substrate processed according to a prior substrate process) and/or current sensor data (e.g., sensor data collected for a current substrate that is being process, or is to be processed, according to a current substrate process).

Data store 140 can store additional types of data, in some embodiments. For example, data store can store metrology data associated with substrates processed using manufacturing equipment 124. Metrology data can include historical metrology data (e.g., metrology measurement values generated for a prior substrate processed using manufacturing equipment 124) and/or current metrology data (e.g., metrology measurement values generated for a current substrate processed using manufacturing equipment 124). Data store 140 can also store contextual data associated with one or more substrates (e.g., prior substrates, current substrates, etc.) at the manufacturing system. Contextual data can include an identifier for a process recipe, an identifier for a substrate (and/or lot of substrates), a preventive maintenance indicator, an identifier for an operator, and so forth.

In some embodiments, data store 140 can be configured to store data that is not accessible to a user (e.g., an operator, an engineer, etc.) of the manufacturing system. For example, process data, sensor data, metrology data, and/or contextual data obtained for a substrate may not be accessible to a user of the manufacturing system. In some embodiments, all data stored at data store 140 is inaccessible by a user (e.g., an operator) of the manufacturing system. In other or similar embodiments, a portion of data stored at data store 140 is inaccessible by the user while another portion of data stored at data store 140 is accessible by the user. In some embodiments, one or more portions of data stored at data store 140 are encrypted using an encryption mechanism that is unknown to the user (e.g., data is encrypted using a private encryption key). In other or similar embodiments, data store 140 includes multiple data stores where data that is inaccessible to the user is stored in one or more first data stores and data that is accessible to the user is stored in one or more second data stores.

Computing system 150 can include a run-to-run (R2R) control engine 152 and/or predictive component 114. R2R control engine 152 can be configured to tune and/or modify process recipe settings for processes performed (or to be performed) using manufacturing equipment 124 in order to optimize the processes and/or cause characteristics of a substrate (e.g., following completion of the process) to correspond to target characteristics, etc. In some embodiments, R2R control engine 152 can tune and/or modify settings for a process recipe associated with a current process to be performed for a substrate at manufacturing equipment 124 in view of data associated with a prior process performed for the substrate and/or data associated with an upstream process performed for the substrate. In some embodiments, one or more processes performed using manufacturing equipment 124 can correspond to a lithography technique to form one or more complex patterns on a surface of a substrate. Each process can correspond to a respective layer of the substrate. A substrate process that is to be performed for a layer of a substrate (e.g., to deposit one or more layers, to etch away portions of one or more layers, etc.) is referred to herein as a current layer process. Such layer is referred to herein as a current layer, as indicated above. A substrate process that was previously performed for a layer of the substrate (e.g., prior to performance of the current layer process) is referred to herein as a prior layer process. Such layer is referred to herein as a prior layer or an initial layer, as indicated above. A processed performed to prepare a substrate for a current layer process is referred to herein as an upstream process (e.g., a polishing process, a roughening process, an etching process, etc.). In some embodiments, the upstream process can be performed for the prior layer (e.g., to prepare a deposition of a current layer on top of the prior layer, etc.).

R2R control engine 152 can determine one or more settings for a process recipe associated with a current layer process that are to be tuned and/or how much a respective process recipe setting is to be tuned based on data associated with a prior layer of a substrate and/or data associated with an upstream process performed for a current layer of the substrate, in some embodiments. In some embodiments, R2R control engine 152 can obtain metrology data associated with a prior layer of a substrate (or lot of substrates) (e.g., from data store 140) and can determine an amount of drift from the obtained metrology data from target metrology data associated with the substrate. R2R control engine 152 can determine a first correction factor to be used to tune the current layer process recipe settings based on the determined amount of drift, in some embodiments. Further details regarding determining an amount of drift associated with the prior layer metrology and determining a correction factor associated with the prior layer are provided herein.

In additional or alternative embodiments, R2R control engine 152 can determine a second correction factor to be used to tune the current layer process recipe settings based on data associated with an upstream process performed for the current layer of the substrate. For example, R2R control engine 152 can obtain process data and/or sensor data associated with an upstream process performed for a current layer of a substrate and can provide the obtained process data and/or sensor data to predictive component 114. Predictive component 114 can provide the process data and/or sensor data as input to a trained machine learning model 190, as described below. The machine learning model 190 can be trained to predict, based on given process data and sensor data, metrology measurement values associated with a substrate and an amount of drift of the metrology measurement values from target metrology measurement values, in some embodiments. Further details regarding the trained machine learning model 190 are provided herein. Predictive component 114 can provide one or more outputs of the trained machine learning model 190 to R2R control engine 152. R2R control engine 152 can determine the second correction factor based on the one or more outputs of the trained machine learning model 190, in accordance with embodiments described herein.

R2R control engine 152 can determine a third correction factor to be used to tune the current layer process recipe settings based on data associated with prior substrates processed according to the current layer recipe, in some embodiments. For example, R2R control engine 152 can obtain metrology data collected for the prior substrates processed according to the current layer recipe and can determine an amount of drift of the obtained metrology data from target metrology data associated with substrates after completion of the current layer process. The third correction factor can correspond to the determined amount of drift, in some embodiments. Further details regarding determining the third correction factor are provided in further detail below.

R2R control engine 152 can determine which settings for the current layer process are to be tuned in view of the first correction factor, the second correction factor and/or the third correction factor, in some embodiments. R2R control engine 152 can, additionally or alternatively, determine how much to tune settings for the current layer process in view of the first correction factor, the second correction factor, and/or the third correction factor, in accordance with embodiments described herein. In some embodiments, R2R control engine 152 can modify a process recipe associated with the current layer process based on the determined modifications or tuning to the process recipe settings. R2R control engine 152 can provide an indication of the modified process recipe to a system controller associated with manufacturing equipment 124, in some embodiments. The system controller can perform the current layer process based on the modified process recipe, in accordance with embodiments of the present disclosure. Further details regarding the R2R control engine 152 and modifying the current layer process recipe are provided herein.

In some embodiments, predictive system 110 includes server machine 170 and server machine 180. Server machine 170 includes a training set generator 172 that is capable of generating training data sets (e.g., a set of data inputs and a set of target outputs) to train, validate, and/or test machine learning model 190. As described above, machine learning model 190 can be trained to predict, based on given process data and/or sensor data associated with an upstream process performed for a current layer of a substrate, metrology data associated with the substrate and, in some embodiments, an amount of the drift of the metrology data from target metrology data associated with the substrate. Some operations of training set generator 172 are described in detail below with respect to FIG. 5. In some embodiments, the training set generator 172 can partition the training data into a training set, a validating set, and a testing set. In some embodiments, the predictive system 110 generates multiple sets of training data.

Server machine 180 includes a training engine 182, a validation engine 184, a selection engine 186, and/or a testing engine 188. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training a machine learning model 190. The machine learning model 190 can refer to the model artifact that is created by the training engine 182 using the training data that includes training inputs and corresponding target outputs (correct answers for respective training inputs). The training engine 182 can find patterns in the training data that map the training input to the target output (the answer to be predicted), and provide the machine learning model 190 that captures these patterns. In some embodiments, the machine learning model 190 uses one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), clustering techniques (e.g., hierarchical clustering techniques), association techniques (e.g., apriori techniques), classification techniques (e.g., decision trees, random forest techniques, etc.), a variational recurrent auto-encoder, etc.

The validation engine 184 can be capable of validating a trained machine learning model 190 using a corresponding set of features of a validation set from training set generator 172. The validation engine 184 can determine an accuracy of each of the trained machine learning models 190 based on the corresponding sets of features of the validation set. The validation engine 184 can discard a trained machine learning model 190 that has an accuracy that does not meet a threshold accuracy. In some embodiments, the selection engine 185 can be capable of selecting a trained machine learning model 190 that has an accuracy that meets a threshold accuracy. In some embodiments, the selection engine 185 can be capable of selecting the trained machine learning model 190 that has the highest accuracy of the trained machine learning models 190.

The testing engine 188 can be capable of testing a trained machine learning model 190 using a corresponding set of features of a testing set from training set generator 172. For example, a first trained machine learning model 190 that was trained using a first set of features of the training set can be tested using the first set of features of the testing set. The testing engine 188 can determine a trained machine learning model 190 that has the highest accuracy of all of the trained machine learning models based on the testing sets.

Predictive server 112 includes a predictive component 114 that is capable of providing process data and/or sensor data associated with an upstream process performed for a current layer of a substrate as input to trained machine learning model 190 and running trained machine learning model 190 on the input to obtain one or more outputs. As described in detail below with respect to FIG. 3, in some embodiments, predictive component 114 is also capable of extracting metrology data from the one or more outputs of the trained machine learning model 190 and using the extracted metrology data to determine one or more metrology measurement values associated with the current layer of the substrate following the upstream process. In some embodiments, predictive component 114 can also determine an amount of drift of the one or more metrology measurement values from target metrology measurement values. Predictive component 114 can provide the determined metrology measurement values and/or the determined amount of drift to R2R control engine 152, in some embodiments. In additional or alternative embodiments, predictive component 114 can provide the one or more outputs of the trained machine learning model 190 to R2R control engine 152. R2R control engine 152 can determine the one or more metrology measurement values associated with the current layer of the substrate following the upstream process and/or the amount of drift of the one or more metrology measurement values from the target metrology measurement values, in some embodiments. R2R control engine 152 can determine the second correction factor based on the amount of drift, in accordance with embodiments described herein.

The client device 120, manufacturing equipment 124, metrology equipment 128, predictive server 112, data store 140, computing system 150, server machine 170, and server machine 180 can be coupled to each other via a network 130. In some embodiments, network 130 is a public network that provides client device 120 with access to computing system 150, predictive server 112, data store 140, and/or other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, may be provided by a fewer number of machines. For example, in some embodiments, server machines 170 and 180 may be integrated into a single machine, while in some other or similar embodiments, server machines 170 and 180, as well as predictive server 112, may be integrated into a single machine. In other or similar embodiments, server machines 170 and 180, predictive server 112, and/or computing system 150 can be integrated into a single machine or one or more machines.

In general, functions described in one implementation as being performed by computing system 150, server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators may be considered a "user."

Figure 2:
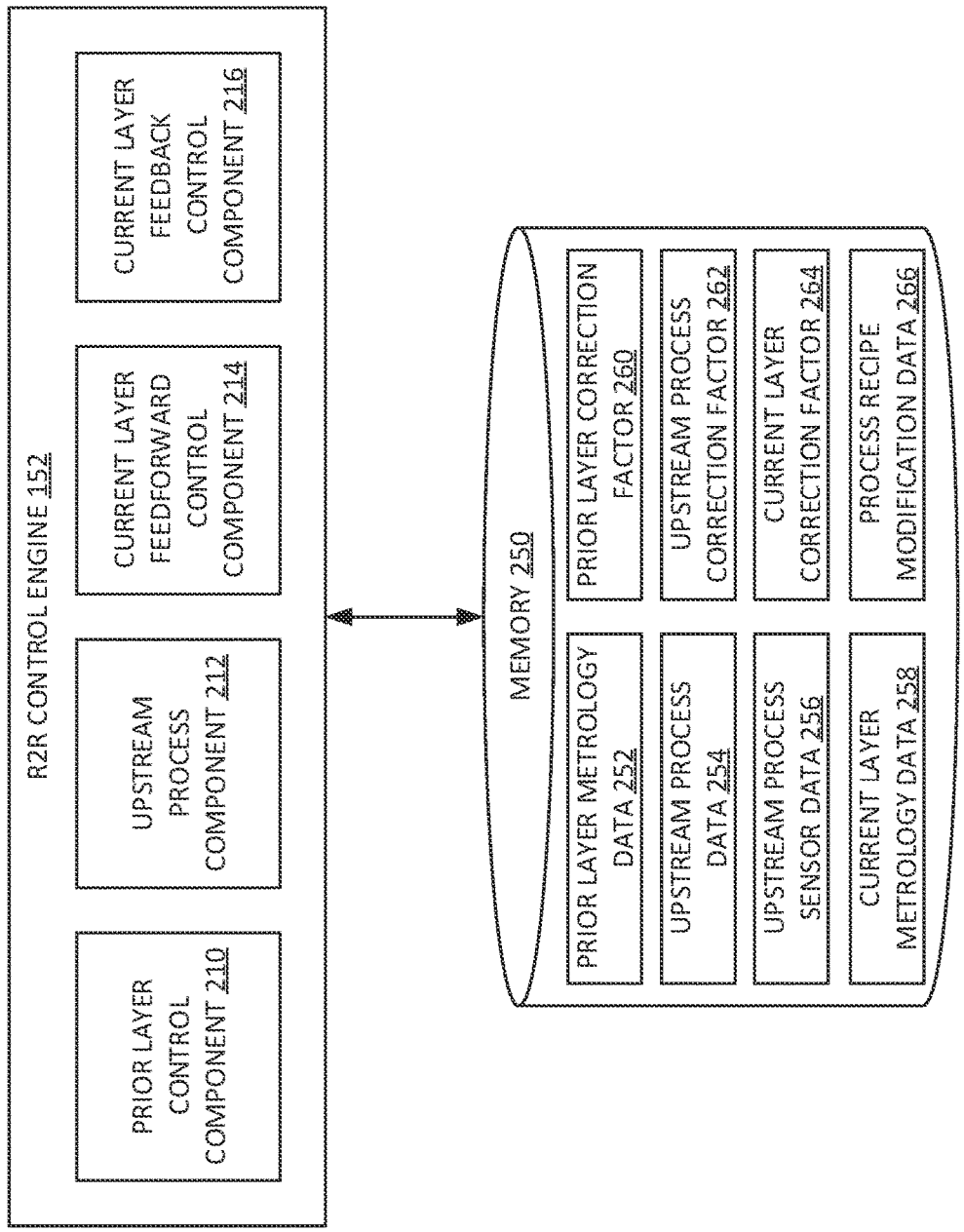
FIG. 2 is a block diagram of an example run-to-run (R2R) control engine, according to aspects of the present disclosure.

FIG. 2 is a block diagram of an example run-to-run (R2R) control engine 152, according to aspects of the present disclosure. As illustrated in FIG. 2, R2R control engine 152 can include a prior layer control component 210, an upstream process component 212, a current layer feed forward control component 214 and/or a current layer feedback control component 216. In some embodiments, R2R control engine 152 can be connected to memory 250 (e.g., via network 130 described with respect to FIG. 1, via a bus, etc.). Memory 250 can correspond to one or more portions of data store 140, in some embodiments.

Prior layer control component 210 can be configured to determine a first correction factor (e.g., prior layer correction factor 260) to be used to tune and/or modify settings associated with a current layer process recipe, as described above. As described above, metrology equipment 128 can generate metrology data associated with a prior layer of a substrate processed using manufacturing equipment 124, in some embodiments. For example, after the prior layer substrate process is completed at manufacturing equipment 124, the substrate can be transferred to metrology equipment 128 and metrology data can be generated and stored at memory 250 as prior layer metrology data 252. It should be noted that metrology data may not be generated for each substrate processed using manufacturing equipment 124, in some embodiments. For example, a lot of two or more substrates can be processed using manufacturing equipment 124. Metrology data 252 can be generated for a portion of substrates included in the lot, as described above. The metrology data 252 generated for the portion of substrates included in the lot can be associated with each substrate in the lot, in some embodiments. In additional or alternative embodiments, metrology data 252 can be generated for each substrate processed using manufacturing equipment 124. Prior layer control component 210 can obtain the prior layer metrology data 252 and can determine the prior layer correction factor 260, in accordance with embodiments described herein.

Upstream process component 212 can be configured to determine a second correction factor (e.g., upstream process correction factor 262) to be used to tune and/or modify the current layer process recipe settings, in some embodiments. In some embodiments, upstream process component 212 can obtain process data associated with the upstream process performed for the current layer of the substrate (e.g., upstream process data 254) and/or sensor data associated with the upstream process (e.g., upstream process sensor data 256) from memory 250 and can provide upstream process data 254 and/or upstream process sensor data 256 as input to machine learning model 190, as described above. In other or similar embodiments, upstream process component 212 can provide upstream process data 254 and/or upstream process sensor data 256 to predictive component 114 and predictive component 114 can provide data 254 and/or data 356 as input to machine learning model 190, as described above. Upstream process component 212 (and/or predictive component 114) can determine metrology data associated with the current layer of the substrate based on one or more outputs of the machine learning model 190, as described above, and can determine the upstream process correction factor 262 based on the determined metrology data and/or a determined drift of the metrology data from target metrology data, in accordance with embodiments described herein.

Current layer feed forward control component 214 can be configured to determine one or more modifications to a process recipe associated with the current layer process to be performed for the substrate. In some embodiments current layer feed forward control component 214 can determine the one or more modifications based on prior layer correction factor 260, upstream process correction factor 262, and/or current layer correction factor 264 and can store the determined one or more modifications as process recipe modification data 266 at memory 250. Further details regarding determining the one or more modifications to the process recipe are provided herein.

Current layer feedback control component 216 can be configured to determine a third correction factor (e.g., current layer correction factor 264) to be used to tune and/or modify the current process recipe settings, in some embodiments. In some embodiments, prior substrates can be processed according to the current layer process recipe, as described above. Metrology equipment 128 can generate metrology data associated with the prior substrates following completion of the current layer process, which can be stored at memory 250 as current layer metrology data 258. Current layer feedback control component 216 can determine the current layer correction factor 264 in view of the current layer metrology data 258, in accordance with embodiments described herein.

FIG. 3 is a flow chart of a method 300 for R2R control at a manufacturing system using machine learning, according to aspects of the present disclosure. Method 300 is performed by processing logic that can include hardware (circuitry, dedicated logic, etc.), software (such as is run on a general purpose computer system or a dedicated machine), firmware, or some combination thereof. In one implementation, method 300 can be performed by one or more components of a system architecture, such as system architecture 100 of FIG. 1. In other or similar implementations, one or more operations of method 300 can be performed by one or more other machines not depicted in the figures. In some aspects, one or more operations of method 300 can be performed by R2R control engine 152 of computing system 150. In other or similar aspects, one or more operations of method 300 can be performed by system controller 228. In yet other or similar aspects, one or more operations of method 300 can be performed by predictive component 114.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, processing logic identifies first data associated with a first process performed for a first layer of a substrate at a manufacturing system. In some embodiments, the first process can correspond to an upstream process performed for a current layer of a substrate using manufacturing equipment 124. As described above, an upstream process can be a process performed to prepare a substrate for a current layer process. In some embodiments, an upstream process can include a polishing process, a roughening process, an etching process, and so forth. In one example, the upstream process can include a chemical mechanical polishing process to prepare a prior layer of the substrate for deposition of a current layer onto the prior layer.

Figure 4:
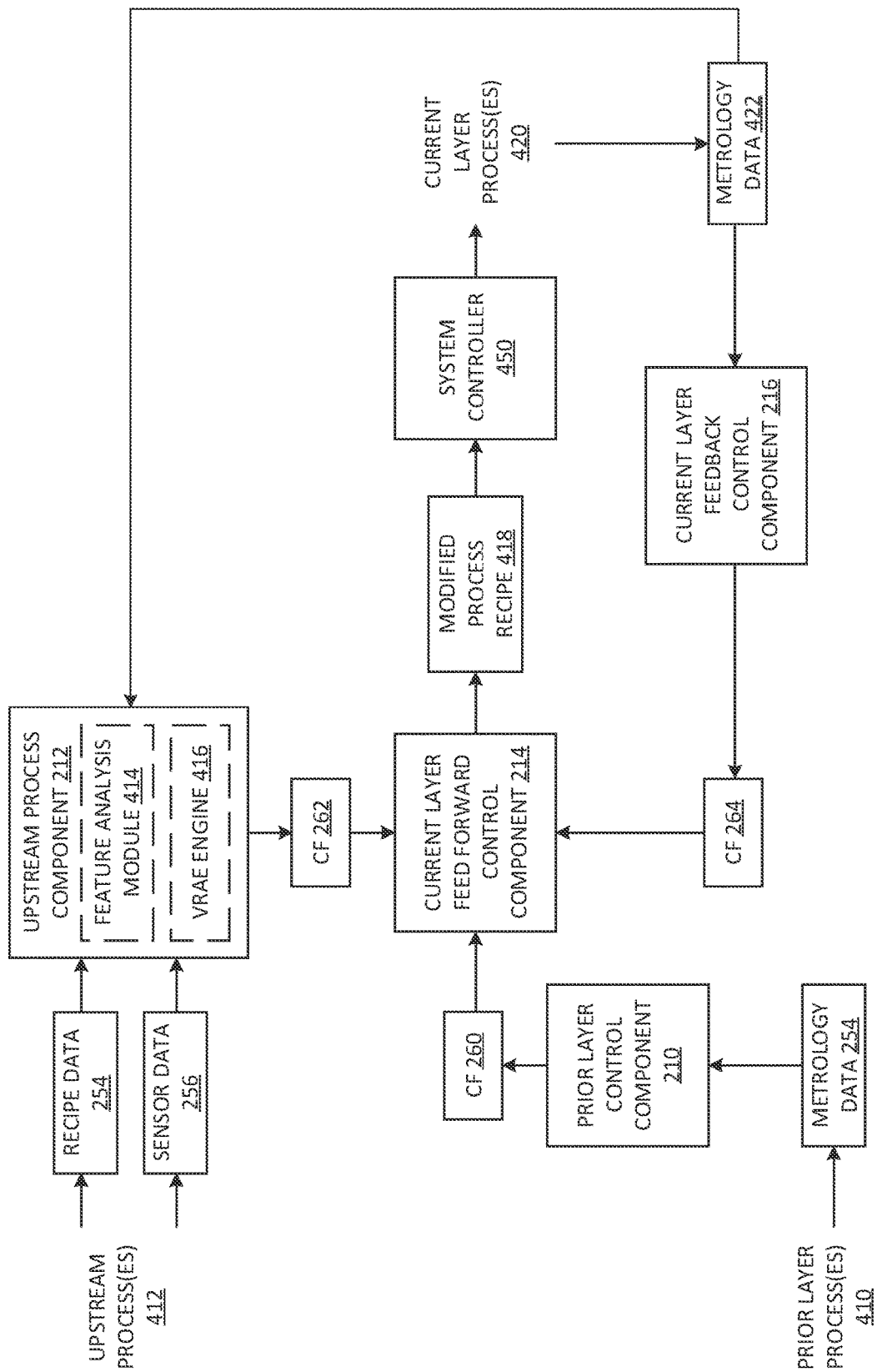
FIG. 4 depicts an example of R2R control at a manufacturing system using machine learning, according to aspects of the present disclosure.

FIG. 4 depicts an example of R2R control at a manufacturing system using machine learning, according to aspects of the present disclosure. As illustrated in FIG. 4, one or more prior layer processes 410 can be performed for a substrate (or lot of substrates) at the manufacturing system using manufacturing equipment 124. As also illustrated in FIG. 4, one or more upstream processes 412 can be performed for the substrate (or lot of substrates) (e.g., following completion of the one or more prior layer processes 410)

using manufacturing equipment 124 (or other equipment of the manufacturing system). Processing logic (e.g., upstream process component 212 of R2R control engine 152) can obtain data associated with upstream process(es) 412. In some embodiments, upstream process component 212 can obtain the upstream process data from memory 250 and/or data store 140, as described above. In other or similar embodiments, a processing component associated with manufacturing equipment 124 (e.g., system controller 450) can obtain the first data (e.g., from memory 250 and/or data store 140) and can transmit the first data to upstream process component 212 (e.g., via network 130, via a bus, etc.).

The upstream process data can include recipe data 254 associated with the upstream process(es) 412 performed for the substrate(s) and/or sensor data 256 collected by sensors at or coupled to the manufacturing system before, during, and/or after performance of the upstream process(es) 412. In accordance with the previous example, the recipe data 254 for a chemical mechanical polishing process can include an indication of one or more operations performed during the process, an indication of characteristics of a pad used for the chemical mechanical polishing process (e.g., a pad material, a pad diameter, a pad hardness, a pad compressibility, etc.), an indication of a rotation speed and/or rotation angle of the pad during the chemical mechanical polishing process, an indication of one or more materials and/or a concentration of such materials used to perform the chemical mechanical polishing process, a downforce associated with the chemical mechanical polishing process, a velocity, relative velocity, and/or other kinematic characteristics of one or more moving components involved in the chemical mechanical polishing process, substrate-pad interfacial characteristics, and so forth. The sensor data 256 can include data collected by sensors before, during, and/or after performance of the chemical mechanical polishing process.

In some embodiments, the amount of upstream process data that is identified or otherwise obtained by upstream process component 212 can be significantly large and/or can include data that does not correspond to particular features of the current layer of the substrate. Accordingly, upstream process component 212 can analyze the upstream process data to identify a portion of the upstream process data that corresponds to particular features of the current layer of the substrate and extract the identified data as the first data, in some embodiments. In some embodiments, upstream process component 212 can include a feature analysis module 414 that is configured to analyze the upstream process data to identify data that is relevant to particular features of the current layer of the substrate. The feature analysis module 414 can provide one or more portions of the upstream process data as input to one or more dimensionality reduction functions. The dimensionality reduction function(s) can plot the upstream process data as points in a real coordinate space and can identify uncorrelated variables of the data points. Data points that correspond to correlated variables can be associated with upstream process data that is relevant to particular features of the current layer of the substrate. In some embodiments, the dimensionality reduction function(s) can correspond to at least one of a principal component analysis function, a partial least squares analysis function or an auto encoder function. The feature analysis module 414 can obtain one or more outputs of the dimensionality reduction function(s). In some embodiments, the one or more outputs of the dimensionality reduction function(s) can indicate the data points corresponding to correlated variables. In some embodiments, the one or more outputs can include an indication of one or more portions of the upstream process data that is relevant to particular features of the current layer of the substrate. Feature analysis module 414 can extract the first data from the one or more outputs, in some embodiments.

Referring back to FIG. 3, at block 312, processing logic (e.g., upstream process component 212) provides the first data as input to a machine learning model. The machine learning model can correspond to machine learning model 190, in some embodiments. As described above, machine learning model 190 can be trained to predict, based on given process data and/or sensor data, metrology measurement values for one or more layers of substrates according to an upstream process and, in some embodiments, an amount of drift of the predicted metrology measurement values from target metrology measurement values for the substrate following the upstream process. Machine learning model 190 can be trained in accordance with embodiments described with respect to FIG. 5, in some embodiments.

In some embodiments, upstream process component 212 can directly provide the first data as input to machine learning model 190 and can obtain one or more outputs of model 190. In other or similar embodiments, upstream process component 212 can provide the first data to predictive component 114 and predictive component 114 can provide the first data as input to the machine learning model 190. In such embodiments, predictive component 114 can obtain one or more outputs of model 190 and, in some embodiments, can provide the one or more outputs to upstream process component 212. The output(s) of machine learning model 190 can include metrology data indicating one or more sets of metrology measurement values and, for each set of metrology measurement values, an indication of a level of confidence that a respective set of metrology measurement values corresponds to the current layer of the substrate (e.g., following completion of the upstream process and/or following completion of the current layer process). In some embodiments, the metrology data can also indicate an amount of drift of each set of metrology measurement values from a target set of metrology measurement values. The target set of metrology measurement values can be provided to system 100 by a user (e.g., a developer, an engineer, an operator, etc.) of the manufacturing system, in some embodiments. In other or similar embodiments, the target set of metrology measurement values can be determined (e.g., by R2R control engine 152, by system controller 450, etc.) in view of experimental data associated with prior substrates processed according to the upstream process recipe and/or the current layer process recipe.

In some embodiments, upstream process component 212 and/or predictive component 114 can identify a respective set of metrology measurement values having a level of confidence that satisfies a confidence criterion. A level of confidence can satisfy the confidence criterion if the level of confidence meets and/or exceeds a threshold level of confidence, in some embodiments. In other or similar embodiments, a level of confidence can satisfy the confidence criterion if the level of confidence meets and/or exceeds a threshold level of confidence and is higher than other levels of confidence associated with other sets of metrology measurement values. Responsive to identifying the respective set of metrology measurement values having the level of confidence that satisfies the confidence criterion, upstream process component 212 and/or predictive component 114 can extract the identified extracted set of metrology measurement values and/or the amount of drift from the one or more outputs of the machine learning model 190. In some embodiments, the outputs of the machine learning model 190 may include one or more sets of metrology measurement values and not an amount of drift of each set of metrology measurement values from target metrology measurement values. In such embodiments, upstream process component 212 and/or predictive component 114 can extract the set of metrology measurement values having the level of confidence that satisfies the level of confidence criterion, as described above, and can compare the extracted set of metrology measurement values to the target metrology measurement values to determine an amount of drift.

As described above, in some embodiments, machine learning model 190 can be a variational recurrent autoencoder (VRAE) model. A VRAE model can be trained to extract, from the upstream process data, data that corresponds to particular features of the current layer and predict the drift of metrology measurement values from the target metrology measurement values in view of the extracted features. Accordingly, the upstream process data obtained by the upstream process component 212 can correspond to the first data that is provided as input to the VRAE model. For example, as indicated in FIG. 4, upstream process component 212 can include a VRAE engine 416, in some embodiments. Responsive to obtaining the upstream process data, VRAE engine 416 of upstream process component 212 can directly provide the upstream process data as input to the VRAE model instead of providing the upstream data to feature analysis module 414, as described above regarding additional embodiments. VRAE engine 416 can extract the amount of drift of the set of metrology measurement values predicted for the current layer of the substrate from the target metrology measurement values from one or more outputs of the VRAE model. In some embodiments, the VRAE model can be trained based on historical data collected for prior layer processes, upstream processes, and/or current layer processes performed at the manufacturing system, or other manufacturing systems associated with system architecture 100.

At block 314, processing logic (e.g., upstream process component 212) determines an amount of drift of a first set of metrology measurement values for the first layer of the substrate following a completion of at least one of the first process (e.g., the upstream process(es) 412) or the second process (e.g., the current layer process) from a target set of metrology measurement values based on one or more outputs of the machine learning model 190. As indicated above, in some embodiments, one or more outputs of the machine learning model 190 can include, for each set of metrology measurement values, an indication of an amount of drift of the respective set of metrology measurement values from the target metrology measurement values. Accordingly, upstream process component 212 can determine the amount of drift of the set of metrology measurement values for the first layer of the substrates based on the indication of the amount of drift extracted from the one or more outputs of machine learning model 190. In other or similar embodiments, upstream process component 212 can compare the set of metrology measurement values extracted from the one or more outputs of the machine learning model 190 to the target metrology measurement values to determine the amount of drift, as indicated above. In some embodiments, upstream process component 212 can further determine the amount of drift based on one or more additional metrology measurement values obtained for prior substrates processed according to the upstream process recipe and/or the current layer process recipe. For example, upstream process component 212 can obtain additional metrology measurement values obtained for prior substrates (e.g., from data store 140 and/or memory 250) to determine whether there is a trend (e.g., over a threshold number of lots) of the metrology measurement values for the prior substrates and/or the current substrates drifting away from the target metrology measurement values. Upstream process component 212 can determine the amount of drift in view of the determined trend, in some embodiments.

At block 316, processing logic (e.g., current layer feed forward control component 214) determines one or more modifications to a process recipe for the second process (e.g., the current layer process) and second data associated with a second layer (e.g., the prior layer) of the substrate. As indicated above, in some embodiments, the amount of drift of the set of metrology measurement values associated with the current layer of the substrate can correspond to a correction factor (e.g., correction factor 262) that is to be used to tune the current layer process recipe settings. For example, the amount of drift of the set of metrology measurement values can indicate that a difference between a predicted smoothness of the current layer of the substrate is a particular number of units off from a target smoothness of the current layer prior to initiation of the current layer process (e.g., a deposition of the current layer, etc.). Accordingly, the correction factor 262 can correspond to a difference or variation of the predicted smoothness of the current layer from the target smoothness that is to be corrected for in tuning and/or modifying the settings for the current layer process recipe. As illustrated in FIG. 4, the determined correction factor 262 can be provided to current layer feed forward control component 214. Feed forward control component 214 can determine the one or more modifications to the process recipe in view of correction factor 262, in accordance with embodiments described below.

As illustrated in FIG. 4, metrology data 254 can be collected for substrates processed according to prior layer process(es) 410, in accordance with previously described embodiments. Prior layer control component 210 can identify or otherwise obtain metrology data 254 (e.g., from data store 140, from memory 250, etc.) and can compare metrology data 254 to target metrology data (e.g., target metrology measurement values) associated with the substrate(s) following a completion of prior layer process(es) 410. In some embodiments, the target metrology data associated with the substrate(s) following the completion of the prior layer process(es) 410 can be provided by a user of the manufacturing system and/or determined based on experimental data collected for prior substrates processed according to the prior layer process(es) 410, in accordance with previously described embodiments. Prior layer control component 210 can determine an amount of drift of the metrology data 254 from the target metrology data, in accordance with previously described embodiments. Correction factor 260 can correspond to the determined amount of drift, as described above with respect to correction factor 262.

As also illustrated in FIG. 4, current layer feed forward control component 214 can obtain another correction factor 264 from current layer feedback control component 216. As described above, current layer feedback control component 216 can identify or otherwise obtain metrology data collected for prior substrates processed according to the current layer process recipe. Current layer feedback control component 216 can compare the obtained metrology data for the prior substrates to target metrology data (e.g., target metrology measurement values) for substrates processed according to the current layer process recipe and can determine an amount of drift of the collected metrology measurement values based on the comparison. The target metrology data for substrates processed according to the current layer process recipe can be provided by a user of the manufacturing system and/or determined based on experimental data collected for prior substrates processed according to the current layer process recipe, in accordance with previously described embodiments. Correction factor 264 can correspond to the determined amount of drift of the prior substrates processed according to the current layer substrate process, as described above with respect to correction factors 260 and 262.

As indicated above, current layer feed forward control component 214 can determine one or more modifications to the current layer process recipe based on correction factors 260, 262, and/or 264. In some embodiments, current layer feed forward control component 214 can determine one or more modifications to the current layer process recipe in view of one or more rules associated with the current layer process. For example, a user (e.g., a developer, an operator, an engineer, etc.) of the manufacturing system can provide an indication of one or more modifications that are to be made to a process recipe in view of variations detected for respective layers of a substrate. The current layer feed forward control component 214 can compare correction factors 260, 262, and/or 264 to variations and/or corrections included in the provided modifications to determine modifications or tunings to be applied to one or more settings of the current layer process recipe. In another example, current layer feed forward control component 214 (or another component of R2R control engine 152 and/or system 100) can identify or otherwise obtain historical and/or experimental data associated with tunings and/or modifications made to substrate process recipes in response to variations detected for respective layers of the substrate. The historical and/or historical data can include, in one example, an indication of a variation or a difference that occurred following completion of the prior layer process(es) 410, the upstream process(es) 412, and/or the current layer process (es) 420 according to the unmodified current layer process recipe and an indication of one or more tunings of modifications made to the current layer process recipe in view of the variation or difference. Current layer feed forward control component 214 can compare correction factors 260, 262, and/or 264 to the identified historical and/or experimental data to determine modifications or tunings to be applied to the one or more settings of the current layer process recipe.

In additional or alternative embodiments, current layer feed forward control component 214 can provide correction factors 260, 262, and/or 264 as input to a machine learning model that is trained to predict, based on one or more given correction factors, one or more modifications to be made to a process recipe in order to cause characteristics of a substrate to correspond to target characteristics. The machine learning model can be trained using historical and/or experimental data associated with prior substrates processed according to the prior layer process(es) 410, the upstream process(es) 412, and/or the current layer process (es) 420 at the manufacturing system, in some embodiments. In other or similar embodiments, the machine learning model can be trained based on historical data and/or experimental data collected for prior substrates processed at other manufacturing systems. Current layer feed forward control component 214 can obtain one or more outputs of the machine learning model. The one or more outputs can include, in some embodiments, process modification data including one or more sets of process recipe modifications and, for each respective set of process recipe modifications, an indication of a level of confidence that a respective set of process recipe modifications correspond to the target characteristics of the substrate. Current layer feed forward control component 214 can identify a set of process recipe modifications having a level of confidence that satisfies a confidence criterion (e.g., exceeds a threshold level of confidence, etc.).

At block 318, processing logic (e.g., current layer feed forward control component 214) updates the process recipe for the second process based on the determined one or more modifications. Current layer feed forward control component 214 can identify the process recipe associated with the current layer process (e.g., at data store 140, memory 250, etc.) and can update one or more settings of the process recipe in view of the determined one or more modifications. Modified process recipe 418, as illustrated in FIG. 4, can correspond to the current layer process recipe modified in accordance with the determined one or more modifications. In some embodiments, current layer feed forward control component 214 can transmit the modified process recipe 418 to system controller 450 (e.g., via network 130, via a bus). In other or similar embodiments, current layer feed forward control component 214 can store modified process recipe 418 at data store 140 and/or memory 250. System controller 450 can access the modified process recipe 418 via data store 140 and/or memory 250 (e.g., via network 130, via the bus, etc.).

System controller 450 can perform the current layer process(es) 420 for the substrate using manufacturing equipment 124 in accordance with the modified process recipe 418, in some embodiments. System controller 450 can perform the current layer process(es) 420 by executing one or more instructions associated with the modified process recipe 418. Following completion of the current layer process(es) 420, the substrate can be transferred to metrology equipment 128 and metrology equipment 128 can collect metrology data 422 associated with the substrate. In some embodiments, current layer feedback control component 216 can determine an amount of drift of metrology data 422 from target metrology data associated with the substrate following the performance of current layer process(es) 420, in accordance with previously described embodiments. Current layer feedback control component 216 can determine another correction factor 264 based on the determined amount of drift of metrology data 422, in some embodiments. The determined correction factor 264 can be used by current layer feed forward control component 214 to determine one or more modifications or tunings to be applied to modified process recipe 418 before current layer process(es) 420 are performed for future substrates at the manufacturing system.

Figure 5:
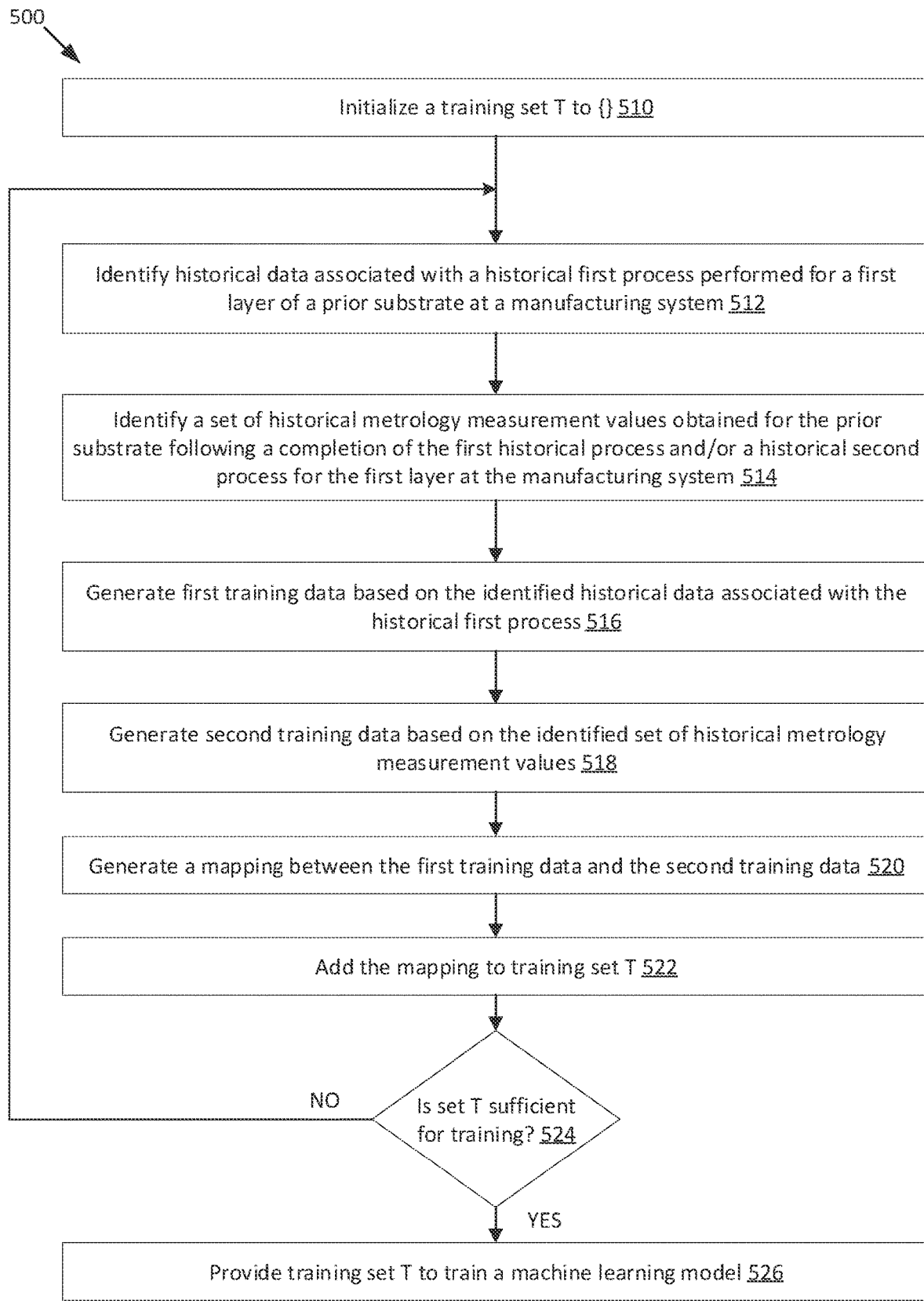
FIG. 5 is a flow chart of a method for training a machine learning model, according to aspects of the present disclosure.

FIG. 5 is a flow chart of a method 500 for training a machine learning model (e.g., machine learning model 190, etc.), according to aspects of the present disclosure. Method 500 is performed by processing logic that can include hardware (circuitry, dedicated logic, etc.), software (such as is run on a general purpose computer system or a dedicated machine), firmware, or some combination thereof. In one implementation, method 500 can be performed by one or more components of a system architecture, such as system architecture 100 of FIG. 1. In other or similar implementations, one or more operations of method 500 can be performed by one or more other machines not depicted in the figures. In some aspects, one or more operations of method 500 can be performed by predictive server 112 of predictive system 110. In other or similar aspects, one or more operations of method 500 can be performed by R2R control engine 152 of computing system 150. In yet other or similar aspects, one or more operations of method 500 can be performed by system controller 450.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 510, processing logic initializes a training set T to an empty set (e.g., 0). At block 512, processing logic identifies historical data associated with a historical first process performed for a first layer of a prior substrate at a manufacturing system. In some embodiments, the historical first process can correspond to a historical upstream processed performed to prepare a substrate for a historical current layer process, in accordance with previously described embodiments. The historical data can include historical process data associated with the historical process and/or historical sensor data collected before, during, or after performance of the historical process. In some embodiments, the historical data can further include contextual data associated with the historical process. For example, the historical can include an indication of a process chamber where the historical process was performed, an indication of a lot associated with the prior substrate, and so forth. In some embodiments, processing logic can identify the historical data from data store 140 and/or memory 250, as described above.

At block 514, processing logic identifies a set of historical metrology measurement values obtained for the prior substrate following a completion of at least one of the historical first process or a historical second process for the first layer at the manufacturing system. In some embodiments, the historical second process can correspond to the historical current layer process. Following completion of the historical first process and/or the historical second process, the historical metrology measurement values can be generated for the prior substrate (e.g., using metrology equipment 128) and stored at data store 140 and/or memory 250. Processing logic can identify the set of historical metrology measurement values from data store 140 and/or memory 250, in accordance with previously described embodiments.

At block 516, processing logic generates first training data based on the identified historical data associated with the historical first process. As described above, in some embodiments, machine learning model 190 can be a variational recurrent auto-encoder model. In such embodiments, the first training data can include the identified historical data associated with the historical first process. In other or similar embodiments, processing logic can provide the identified historical data as input to one or more dimensionality reduction functions. The dimensionality reduction function(s) can correspond to dimensionality reduction functions described with respect to feature analysis module 414 of FIG. 4. Processing logic can obtain one or more outputs of the dimensionality reduction function(s). The one or more outputs of the dimensionality reduction function(s) can correspond to a portion of the historical data that is relevant to particular features of a historical current layer of the prior substrate.

Processing logic can include the relevant portion of the historical data in the generated first training data. In additional or alternative embodiments, processing logic can also include, in the first training data, an indication of a particular data cluster corresponding to the historical process performed for the prior substrate. In an illustrative example, processing logic can provide contextual data, the historical data, and/or the relevant portion of the historical data as input to one or more data clustering function(s). The data clustering function(s) can be configured to determine which data clusters to assign the relevant portion of the historical data in view of the contextual data and/or one or more features associated with the historical data. In some embodiments, the historical data can be clustered in view of the type of equipment used to perform the historical process (e.g., as indicated by the contextual data), the types of defects and/or variations detected for the prior substrate (e.g., as indicated by the historical process data and/or the historical sensor data) and/or one or more settings of the process recipe for the historical process (e.g., as indicated by the historical process data). Processing logic can extract, from one or more outputs of the data clustering function(s), an identifier associated with a particular cluster associated with the relevant portion of the historical data and can include the extracted identifier with the relevant portion of the historical data in the generated first training data. It should be noted that in additional or alternative embodiments, processing logic may not provide the relevant portion of the historical data (and/or the historical contextual data and/or historical data) as input to the clustering function(s). Instead, the relevant portion of the historical data can be clustered by the machine learning model (e.g., in accordance with one or more machine learning techniques).

At block 518, processing logic can generate second training data based on the identified set of historical metrology measurement values. The generated second training data can include an indication of one or more of the identified set of historical metrology measurement values, in some embodiments. At block 520, processing logic generates a mapping between the first training data and the second training data. At block 522, processing logic adds the mapping to training set T. At block 524, processing logic determines whether the training set T includes a sufficient amount of training data to train a machine learning model. It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine learning model, method 500 returns to block 512. Responsive to determining the training set, T, includes a sufficient amount of training data to train the machine learning model, method 500 continues to block 528.

At block 528, processing logic provides training set T to train the machine learning model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T. After block 528, machine learning model 190 can be used to predict, given process data and/or sensor data, metrology measurement values associated with a substrate and an amount of drift of the metrology measurement values from target metrology measurement values, in accordance with embodiments described above.

Figure 6:
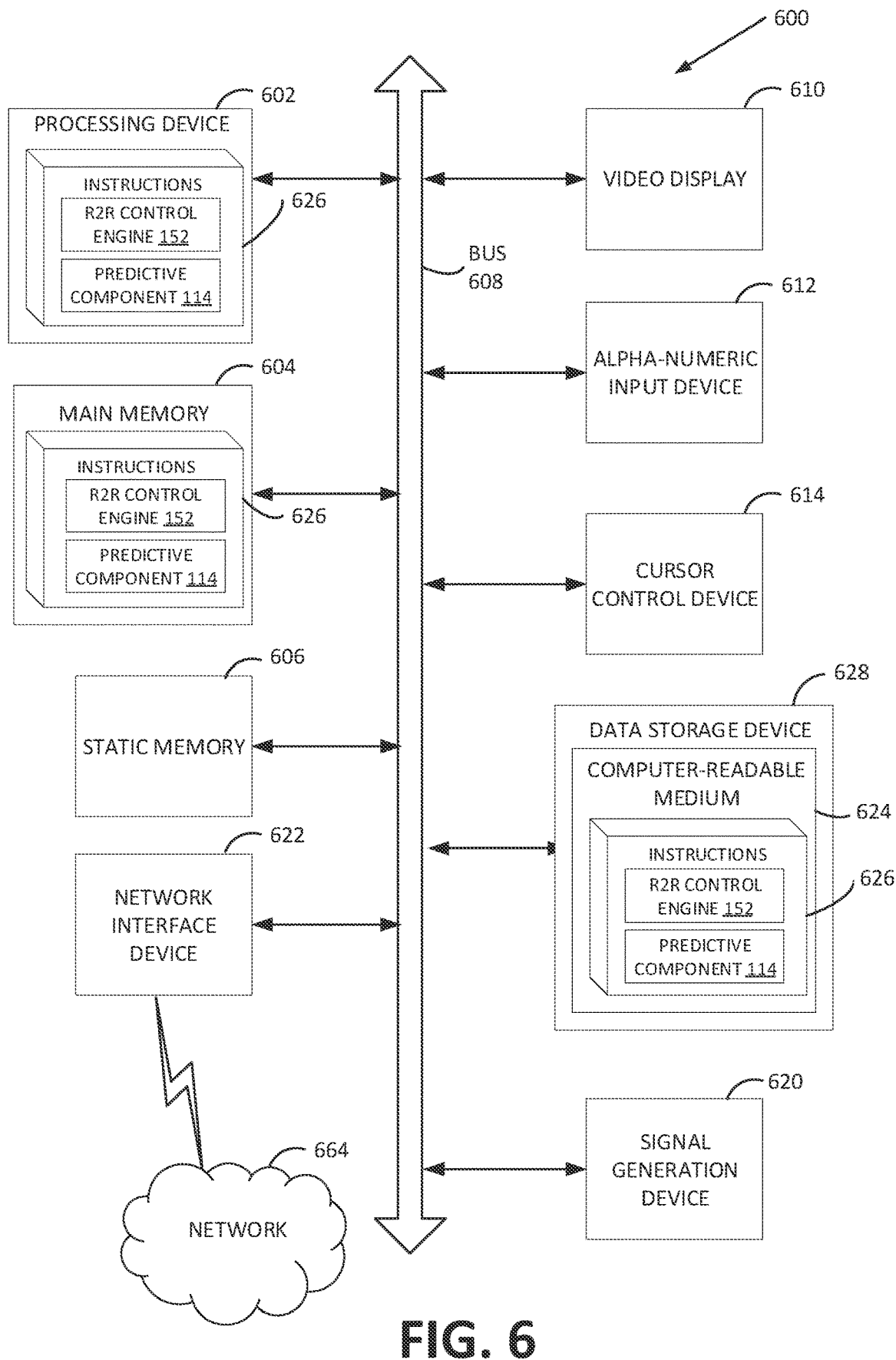
FIG. 6 depicts a block diagram of an illustrative computer system operating in accordance with one or more aspects of the present disclosure.

FIG. 6 depicts a block diagram of an illustrative computer system 600 operating in accordance with one or more aspects of the present disclosure. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 600 may correspond to predictive server 112 and/or computing system 150 of FIG. 1, system controller 450 of FIG. 4, and/or another processing device of manufacturing system 100.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 may represent one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 may also be or include a system on a chip (SoC), programmable logic controller (PLC), or other type of processing device. Processing device 602 is configured to execute the processing logic for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. Wherein a non-transitory storage medium refers to a storage medium other than a carrier wave. The instructions 626 may also reside, completely or at least partially, within the main memory 604 and/or within the processing device 602 during execution thereof by the computer device 600, the main memory 604 and the processing device 602 also constituting computer-readable storage media.

The computer-readable storage medium 624 may also be used to store model 190 and data used to train model 190. The computer readable storage medium 624 may also store a software library containing methods that call model 190. While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying first data associated with a first process performed for a first layer of a substrate at a manufacturing system, wherein the first layer of the substrate is to be further processed according to a second process at the manufacturing system;
providing the first data as input to a machine learning model, wherein the machine learning model is trained to predict metrology measurement values for one or more layers of substrates processed at the manufacturing system;
determining, based on one or more outputs of the machine learning model, an amount of drift of a first set of metrology measurement values for the first layer of the substrate following a completion of at least one of the first process or the second process from a set of target metrology measurement values;
determining one or more modifications to a process recipe for the second process in view of the determined amount of drift and second data associated with a second layer of the substrate, wherein the second layer of the substrate was previously processed at the manufacturing system according to a third process; and
updating the process recipe for the second process based on the determined one or more modifications.

2. The method of claim 1, wherein the one or more modifications to the process recipe for the second process are further determined in view of third data comprising one or more metrology measurement values associated with another substrate processed according to the second process at the manufacturing system.

3. The method of claim 1, wherein identifying the first data associated with the first process performed for the first layer of the substrate comprises:
providing a set of data associated with the first process performed for the first layer of the substrate as input to one or more dimensionality reduction functions; and
extracting the first data from an output of the one or more dimensionality reduction functions.

4. The method of claim 3, wherein the one or more dimensionality reduction functions comprise at least one of a principal component analysis function, a partial least squares analysis function, or an auto encoder function.

5. The method of claim 1, wherein the machine learning model is a variational auto encoder model.

6. The method of claim 1, further comprising:
identifying a second set of metrology measurement values for the first layer of the substrate, wherein the second set of metrology measurement values are generated for the first layer of the substrate following a completion of a substrate process for the first layer of the substrate according to the updated process recipe; and
updating at least one of the updated process recipe or another process recipe for the third process in view of the identified second set of metrology measurement values.

7. The method of claim 1, wherein the process recipe corresponds to one or more operations associated with a lithography process.

8. The method of claim 7, wherein the first process performed for the first layer of the substrate comprises at least one of a chemical mechanical polishing process, an etching process, or a deposition process.

9. The method of claim 1, wherein the first process comprises a chemical mechanical polishing process, the second process comprises one or more first operations of a lithography process, and the third process comprises one or more second operations of the lithography process that are performed prior to the one or more first operations.

10. A system comprising:
a memory; and
a processing device coupled to the memory, the processing device to:
identify first data associated with a first process performed for a first layer of a substrate at a manufacturing system, wherein the first layer of the substrate is to be further processed according to a second process at the manufacturing system;
provide the first data as input to a machine learning model, wherein the machine learning model is trained to predict metrology measurement values for one or more layers of substrates processed at the manufacturing system;
determine, based on one or more outputs of the machine learning model, an amount of drift of a first set of metrology measurement values for the first layer of the substrate following a completion of at least one of the first process or the second process from a target set of metrology measurement values;
determine one or more modifications to a process recipe for the second process in view of the determined amount of drift and second data associated with a second layer of the substrate, wherein the second layer of the substrate was previously processed at the manufacturing system according to a third process; and
update the process recipe for the second process based on the determined one or more modifications.

11. The system of claim 10, wherein the one or more modifications to the process recipe for the second process are further determined in view of third data comprising one or more metrology measurement values associated with another substrate processed according to the second process at the manufacturing system.

12. The system of claim 10, wherein to identify the first data associated with the first process performed for the first layer of the substrate, the processing device is to:
provide a set of data associated with the first process performed for the first layer of the substrate as input to one or more dimensionality reduction functions; and
extract the first data from an output of the one or more dimensionality reduction functions.

13. The system of claim 12, wherein the one or more dimensionality reduction functions comprise at least one of a principal component analysis function, a partial least squares analysis function, or an auto encoder function.

14. The system of claim 10, wherein the machine learning model is a variational auto encoder model.

15. The system of claim 10, wherein the processing device is further to:
identify a second set of metrology measurement values for the first layer of the substrate, wherein the second set of metrology measurement values are generated for the first layer of the substrate following a completion of a substrate process for the first layer of the substrate according to the updated process recipe; and
update at least one of the updated process recipe or another process recipe for the third process in view of the identified second set of metrology measurement values.

16. The system of claim 10, wherein the first process comprises a chemical mechanical polishing process, the second process comprises one or more first operations of a lithography process, and the third process comprises one or more second operations of the lithography process that are performed prior to the one or more first operations.

17. A non-transitory computer readable medium comprising instructions that, when executed by a processing device, cause the processing device to:
- identify first data associated with a first process performed for a first layer of a substrate at a manufacturing system, wherein the first layer of the substrate is to be further processed according to a second process at the manufacturing system;
- provide the first data as input to a machine learning model, wherein the machine learning model is trained to predict metrology measurement values for one or more layers of substrates processed at the manufacturing system;
- determine, based on one or more outputs of the machine learning model, an amount of drift of a first set of metrology measurement values for the first layer of the substrate following a completion of at least one of the first process or the second process from a target set of metrology measurement values;
- determine one or more modifications to a process recipe for the second process in view of the determined amount of drift and second data associated with a second layer of the substrate, wherein the second layer of the substrate was previously processed at the manufacturing system according to a third process; and
- update the process recipe for the second process based on the determined one or more modifications.

18. The non-transitory computer readable medium of claim 17, wherein the one or more modifications to the process recipe for the second process are further determined in view of third data comprising one or more metrology measurement values associated with another substrate processed according to the second process at the manufacturing system.

19. The non-transitory computer readable medium of claim 17, wherein to identify the first data associated with the first process performed for the first layer of the substrate, the processing device is to:
- provide a set of data associated with the first process performed for the first layer of the substrate as input to one or more dimensionality reduction functions; and
- extract the first data from an output of the one or more dimensionality reduction functions.

20. The non-transitory computer readable medium of claim 17, wherein the first process comprises a chemical mechanical polishing process, the second process comprises one or more first operations of a lithography process, and the third process comprises one or more second operations of the lithography process that are performed prior to the one or more first operations.

* * * * *